United States Patent
Fridley

(10) Patent No.: US 10,124,523 B2
(45) Date of Patent: Nov. 13, 2018

(54) DIE PLATE WITH DIE PLATE BODY HAVING AN APERTURED DOWNSTREAM FACE COVERED BY A SOLID FACE PLATE

(71) Applicant: Gala Industries, Inc., Eagle Rock, VA (US)

(72) Inventor: Michael A. Fridley, Troutville, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 277 days.

(21) Appl. No.: 14/931,072

(22) Filed: Nov. 3, 2015

(65) Prior Publication Data

US 2016/0144548 A1    May 26, 2016

Related U.S. Application Data

(60) Provisional application No. 62/082,280, filed on Nov. 20, 2014.

(51) Int. Cl.
*B29B 9/06* (2006.01)
*B29C 47/00* (2006.01)
(Continued)

(52) U.S. Cl.
CPC .......... *B29C 47/0085* (2013.01); *B29B 9/065* (2013.01); *B29C 47/0066* (2013.01);
(Continued)

(58) Field of Classification Search
CPC ............ B29C 47/0066; B29C 47/0085; B29C 47/085; B29C 47/30; B29B 9/06; B29B 9/065
See application file for complete search history.

(56) References Cited

U.S. PATENT DOCUMENTS

| 3,492,716 A | 2/1970 | McNeal, Jr. |
| 3,867,082 A * | 2/1975 | Lambertus .............. B29B 9/065 |
| | | 425/313 |

(Continued)

FOREIGN PATENT DOCUMENTS

| DE | 202006004677 | 6/2006 |
| DE | 202010004632 | 11/2010 |

(Continued)

*Primary Examiner* — Yogendra N Gupta
*Assistant Examiner* — Joseph S Leyson
(74) *Attorney, Agent, or Firm* — Jacobson Holman, PLLC.

(57) ABSTRACT

A die plate is provided for an underwater pelletizer. The die plate includes a die plate body and a solid face plate. The downstream face of the die plate body has a plurality of insulation holes drilled therein that reduce the surface area contact between the die plate body and the solid face plate that is secured to the downstream face of the die plate body to form the cutting surface. In addition, a circular groove is preferably milled into the downstream face of the die plate body. The groove is concentric with the outer perimeter of the die plate body and creates an outer ring and a center boss. The outer downstream surface of the boss is flush with the outer downstream surface of the outer ring so that the boss and ring together form the downstream face of the die plate body for supporting the solid face plate. The insulation holes and groove are filled with a non-reactive atmosphere such as nitrogen, inert gas(es), a vacuum or a partial vacuum.

21 Claims, 11 Drawing Sheets

(51) Int. Cl.
*B29C 47/30* (2006.01)
*B29C 47/08* (2006.01)

(52) U.S. Cl.
CPC .......... *B29C 47/30* (2013.01); *B29C 47/0014* (2013.01); *B29C 47/085* (2013.01)

(56) References Cited

U.S. PATENT DOCUMENTS

| | | |
|---|---|---|
| 4,264,553 A | 4/1981 | Loo |
| 5,714,173 A | 2/1998 | Matsuo |
| 5,989,009 A | 11/1999 | Matsuo |
| 6,521,353 B1 | 2/2003 | Majagi et al. |
| 6,824,371 B2 | 11/2004 | Smit |
| 6,976,834 B2 | 12/2005 | Knight et al. |
| 8,512,021 B2 | 8/2013 | Broughman |
| 2001/0005515 A1 | 6/2001 | Schneider et al. |
| 2005/0035483 A1* | 2/2005 | Jackson .................. B01J 2/20 264/142 |
| 2007/0264379 A1 | 11/2007 | Broughman |
| 2010/0129479 A1 | 5/2010 | Banerjee et al. |
| 2016/0082620 A1 | 3/2016 | Dahlheimer et al. |

FOREIGN PATENT DOCUMENTS

| | | |
|---|---|---|
| EP | 2996849 | 3/2016 |
| JP | S51-6045 | 5/1976 |
| JP | 2009-537351 | 10/2009 |
| JP | 2012-500131 | 1/2012 |
| KR | 10-264151 | 10/1998 |
| KR | 10-1408165 | 6/2014 |
| WO | WO 2007/079839 | 7/2007 |
| WO | WO 2007/142783 | 12/2007 |
| WO | WO 2014/183877 | 11/2014 |

\* cited by examiner

DIE PLATE WITH DIE PLATE BODY HAVING AN APERTURED DOWNSTREAM FACE COVERED BY A SOLID FACE PLATE

This application is a non-provisional application claiming the priority of underlying U.S. provisional application, Ser. No. 62/082,280, filed on Nov. 20, 2014.

BACKGROUND OF THE INVENTION

Field of the Invention

The present invention is related to the field of underwater pelletizers and, more particularly, to an extrusion die plate for an underwater pelletizer having a die plate body with an apertured downstream face and a solid face plate.

Description of the Related Art

Known underwater pelletizers include an extrusion die or die plate having extrusion orifices extending therethrough and through which molten polymer is extruded. A cutter hub with cutter knives is oriented in rotatable facing relationship to the face of the extrusion die plate to cut the strands of polymer into pellets. A water box or cutting chamber with a water inlet and outlet provides circulation of water to cool and solidify the strands of extruded polymer to enable the knives on the cutter hub to cut the strands into pellets. The water circulating through the water box also entrains the pellets into a slurry of water and pellets which are discharged through the outlet of the water box.

A known practice is to provide a recess in the die face of the extrusion die plate and place insulation material in the recess to reduce heat transfer from the extrusion die plate and molten polymer being extruded through the extrusion orifices to the water circulating through the water box. The insulation material inserted into the recess is typically a gasket material mounted in place by a suitable mastic, glue or the like and covered with a thin metal plate in the recess. The thin plate is secured to the die plate by suitable fasteners to maintain the insulation material in place in the recess. The insulation material is subjected to substantial degradation due to the temperatures encountered in the recess and, in some instances, does not effectively insulate the central recess area of the die face. Ineffective insulation can result in excessive cooling of the molten polymer as it is being extruded through the extrusion orifices causing freeze off of the molten polymer at the die face.

One solution to these problems is to provide an insulation plug in the form of a circular plate that substantially fills the recess in the die face, as set forth in U.S. Pat. No. 6,824,371 ("the '371 patent"), which is commonly owned by the assignee of the instant application. The entire disclosure of the '371 patent is hereby expressly incorporated by reference in its entirety as though fully set forth herein.

The circular plate of the '371 patent, referred to herein as a gasket eliminator plug (GEP), reduces the transfer of heat from the molten polymer being extruded through the orifices in the extrusion die plate to the water circulating through the water box of the underwater pelletizer, and further is not subject to deterioration and degradation as encountered with conventional insulation techniques. However, the tolerance between the GEP of the '371 patent, or conventional insulation materials, and the die face is very small. Hence, it is easy to damage the die face when installing or removing the GEP during routine maintenance. This is a problem in that the GEP is relatively expensive to manufacture and yet, to work correctly, must have a tight fit within the die plate.

Another solution to the problem of excessive cooling of the molten polymer as it is being extruded through the extrusion orifices is described in U.S. Pat. No. 8,512,021 ("the '021 patent"), which is also co-owned by the assignee of the instant application. The entire disclosure of the '021 patent is hereby expressly incorporated by reference in its entirety as though fully set forth herein.

The downstream face of the solid face die plate described in the '021 patent has a solid center that eliminates the need for the GEP. The solid face die plate works well when palletizing polymers like polyethylene, EVA and PVC. However, when pelletizing high temperature materials like PET, Nylon 6,6 and polycarbonate, it would be desirable to have even better thermal performance than that provided by the solid face die plate design of the '021 patent.

SUMMARY OF THE INVENTION

In order to overcome the known problems associated with the insulation techniques of the prior art, and to provide improved, insulating performance, the present invention provides a die plate for an underwater pelletizer having a die plate body with an apertured downstream face and a solid face plate. The die plate body may be unitary in construction but preferably has a two-part construction including a die plate base member and a removable die insert body as disclosed in the '021 patent. As used herein, "die plate body" and "die insert body" are used interchangeably.

The die insert body has an apertured downstream face covered by a solid face plate which is made up of a carrier or holding plate with a hard anti-wear element (or elements) surrounding the extrusion die holes. The carrier is in the shape of a flat disc made of one piece of material and preferably has a generally annular slot or channel adjacent its periphery for holding the hard anti-wear element that is preferably in the shape of a flat, generally annular ring. Once fitted within the slot or channel, the hard anti-wear ring element is held, supported and protected by the carrier. The hard anti-wear ring element may be attached to the carrier and secured within the channel by welding, brazing, including nitrogen atmosphere brazing and vacuum brazing, or other comparable technique.

The solid face plate is affixed to the downstream apertured face of the die insert body so as to be in contact with cutter knives and the water flowing through the cutting chamber. Because the face plate is solid, water flowing through the cutting chamber is prevented from leaking behind the die plate. The solid face plate also ensures that molten polymer behind the die plate cannot leak into the cutting chamber.

The apertured downstream face of the die plate body is provided with a plurality of open apertures or longitudinally extending insulation holes formed, at least in the center portion thereof. In addition, to being formed in the center portion, the longitudinally extending insulation holes may also be formed adjacent the outer periphery of the die plate body, in between the extrusion orifices. The insulation holes, which do not extend all the way through the die plate body, remain hollow or open when covered by the face plate and serve to restrict heat transfer to the carrier by reducing the surface area of the die plate body in contact with the solid face plate.

In addition to a plurality of open or hollow insulation holes in the downstream face, the apertured face die plate body can have a circular groove cut therein between the periphery of the die plate body, where the extrusion orifices are formed, and a centermost part of the die plate body. The circular groove divides the downstream face into an outer ring containing the extrusion orifices and a center boss with the insulation holes formed therein. The combination of the circular groove and the insulation holes significantly reduces the surface contact area of the downstream face of the apertured die plate body with the solid face plate, again restricting heat transfer to the carrier to provide improved insulating performance.

It is, therefore, an object of the present, invention to provide a die plate including a die plate body and a solid face place for an underwater pelletizer in which the downstream face of the die plate body has a plurality of hollow or open insulation holes drilled in at least its center portion for improved insulation against heat transfer to the carrier.

Another object of the present invention is to provide a die plate in accordance with the preceding object in which a plurality of hollow or open insulation holes are also drilled into the outer periphery of the die plate body between the extrusion orifices as well as in the center portion of the die plate body downstream face.

A further object of the present invention is to provide a die plate in accordance with the preceding object or the two immediately preceding objects in which the die plate body downstream face has a circular groove cut therein forming an outer ring containing the extrusion orifices and a center boss having a plurality of insulation holes therein.

Still another object of the present invention is to provide a die plate in accordance with the preceding objects in which the solid face plate has a unitary disc-shaped carrier with an annular slot or channel formed therein and a hard anti-wear ring-like element fitted within the slot or channel to be flush within the downstream face of the carrier adjacent its periphery.

Yet another object of the present invention is to provide a die plate in accordance with the preceding objects that has a die insert body with an apertured downstream face and a solid face plate that can be permanently or removably attached to the apertured downstream face of the die insert body, with removable attachment allowing the same die insert body to be assembled with multiple solid face plates. Removable attachment also results in cost and time savings as only the solid face plate, needs to be replaced instead of the entire die insert body.

A still further object of the present invention is to provide a die plate in accordance with the preceding objects which reduces heat transfer from the molten polymer and the housing of an underwater pelletizer to water circulating through the cutting chamber associated with the cutter hub, cutter knives and die face.

Yet another object of the present invention is to provide a die plate for an underwater pelletizer in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
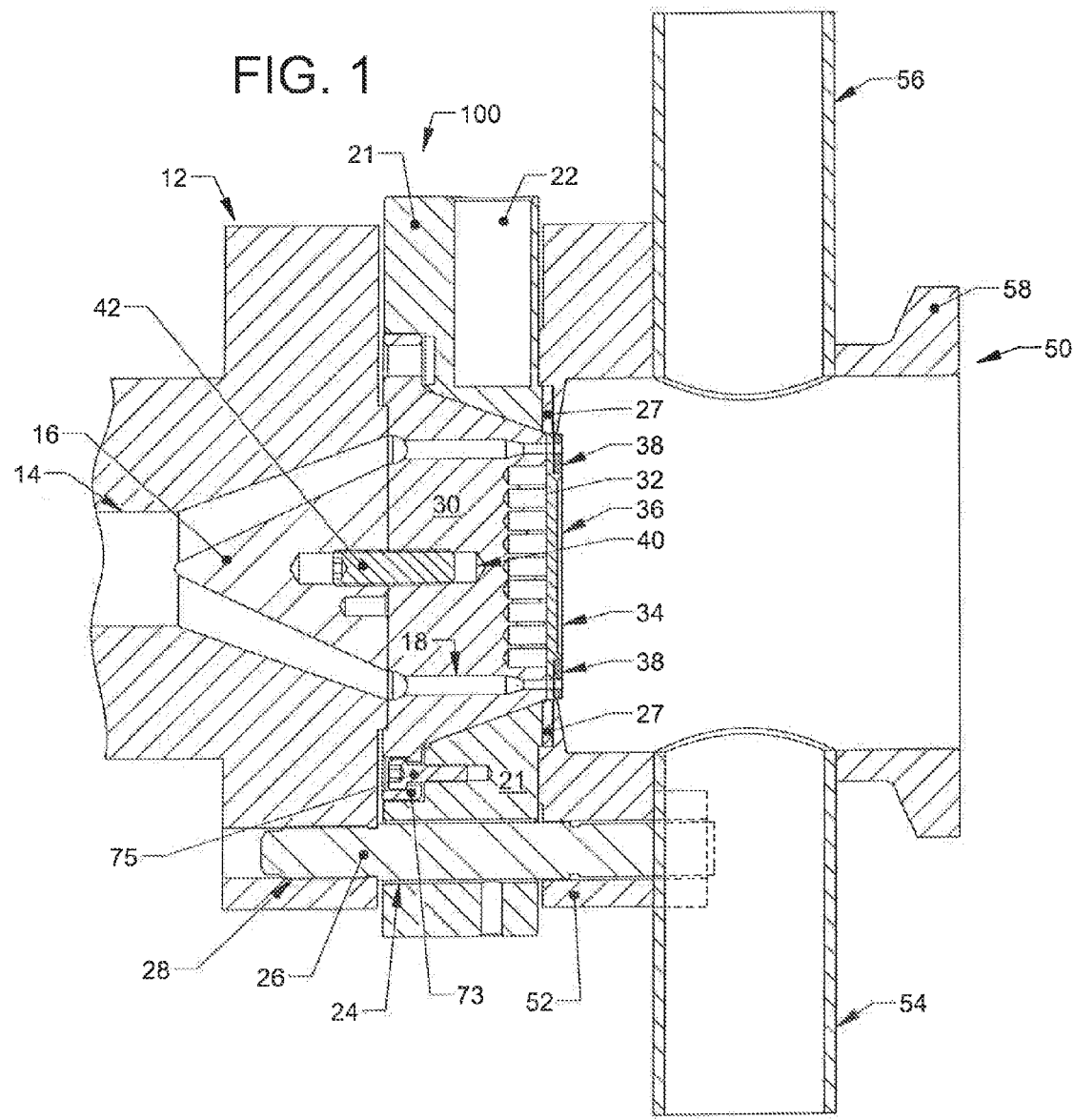
FIG. 1 is a partial sectional view of an underwater pelletizer illustrating a two-part die plate body including a base member and a die insert body having an apertured downstream face with a solid face plate mounted on said apertured face in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
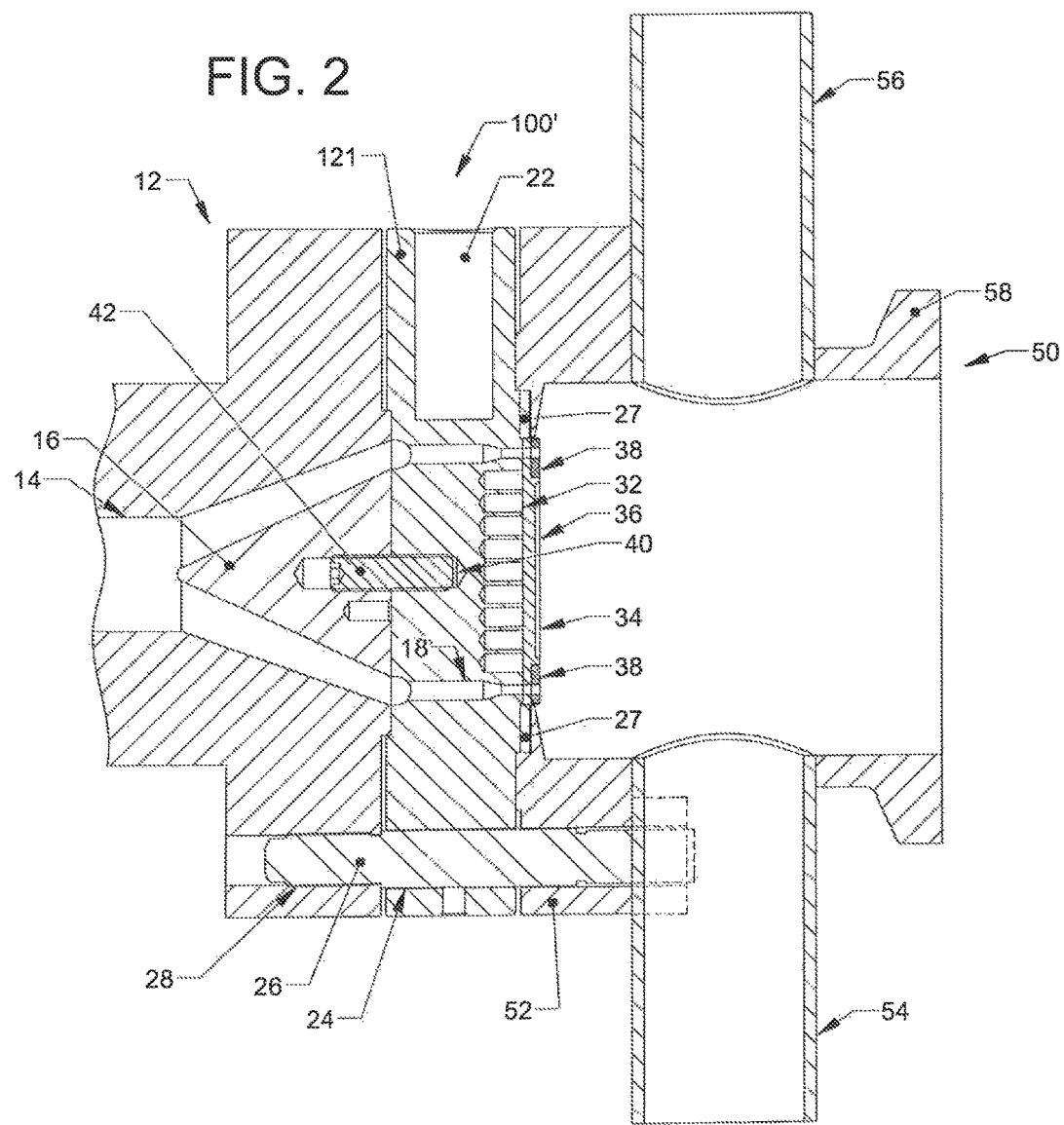
FIG. 2 is a partial sectional view of an underwater pelletizer like that shown in FIG. 1 but illustrating a unitary die plate body having an apertured downstream face with the solid face plate thereon in accordance with the present invention.

FIGS. 1 and 2 of the drawings each illustrate an underwater pelletizer including a die plate in accordance with the present invention, generally designated by reference numerals 100, 100', respectively. The die plate 100 in FIG. 1 has a two-part construction including a die plate base member 21 and a removable die insert body 30 fitted therein. FIG. 2 illustrates a die plate 100' like that in FIG. 1 but having a body 121 that is unitary in construction. For ease of discussion herein, reference will be made to the "die insert body" with the understanding that this terminology is also intended to include die plate bodies of unitary construction.

The die plate 100, 100' is mounted on a housing, generally designated by reference numeral 12, of an extruder. The housing 12 includes an inlet passageway 14 for receiving molten polymer from upstream equipment. The molten polymer is diverted outwardly by a nose cone 16 and passes through a plurality of extrusion orifices 18 in the die plate 100. The die plate 100 preferably has radial heating elements 22 extending inwardly from the periphery thereof and a plurality of apertures 24 receiving bolts 26 which are threaded into threaded apertures 28 in housing 12.

Whether unitary or two-part in construction, the die plate 100, 100' has an attaching surface 32 on its downstream side. Mounted on the attaching surface 32 is a solid face plate, generally designated by reference numeral 34, that includes a disc-shaped carrier 36 and a generally annular, hard anti-wear element 38 inset within an annular slot or channel in the carrier as is more fully described in the '021 patent. The downstream side of the solid face plate having the hard anti-wear element forms a pelletizer cutting surface. The outer periphery of the solid face plate 34 has a plurality of apertures or extrusion orifice extensions therethrough that align with the extrusion orifices 18 in the die plate body. As used herein, unless otherwise stated, the term "extrusion orifices" is intended to include both the orifices 18 in the die plate body and the extrusion orifice extensions that are in alignment with the orifices 18 and which form exit openings 19 in the solid face plate for the extruded polymer.

The die plate 100, 100' also includes a bore 40 to accommodate a fastening element 42 used to hold the nose cone 16 in place on the die plate. In the embodiment shown in FIG. 1, the bore 40 is in the die insert body 30 portion of the two-part die plate 100.

A water box or cutting chamber, generally designated by reference numeral 50, in the form of a hollow housing includes a flange 52 secured to the die plate 100, 100' and housing 12 by the bolts 26. A seal gasket 27 ensures a watertight seal between the die plate 100, 100' and carrier 36, and the cutting chamber 50.

The cutting chamber 50 includes a water inlet 54, a water and pellet slurry outlet 56 and a flange 58 associated with a similar flange on a drive unit (not shown). Water circulating through the cutting chamber cools and solidifies the extruding polymer and entrains the pellets into a water and pellet slurry for discharge through outlet 56. Other standard components associated with the cutting chamber and pelletizer such as the drive shaft, cutter hub and cutter knives for cutting polymer strands extruded through the orifices 18 at the pelletizer cutting surface into pellets are not shown but are of conventional design and function in a well known manner to extrude molten polymer through extrusion holes or orifices 18 in the die plate 100, 100' as would be known by persons of ordinary skill in the art.

The solid face plate 34, including the hard anti-wear element 38 fitted within the carrier 36, sits flush with the die insert body 30 and may be attached thereto by welding, brazing or other comparable technique. One preferred method is nitrogen atmosphere brazing, with a more preferred method being vacuum brazing.

Alternatively, the solid face plate 34 may be bolted in position. If bolted, fastening elements such as socket head cap screws are fitted into counter-bored holes provided in the inner surface of the hard anti-wear element (not shown).

With this construction, the solid face plate 34 is interchangeable and can be replaced separately from the die insert body resulting in cost savings to the user. The user can also use the same die insert body with multiple solid face plates which provides a benefit for maintenance purposes between product changes.

Given the embedded position of the hard anti-wear element 38 within the carrier 36, the carrier protects the edges 60 (see FIGS. 6 and 10) of the hard anti-wear element 38, preventing them from being damaged. The one-piece construction of the carrier 36 also eliminates the need for an insulation plate, or GEP such as that described in the '371 patent. Given the cost of manufacturing a GEP, its elimination also results in cost savings to the user. Additionally, because of the carrier is solid, i.e., the carrier covers the entire downstream face of the die plate including the central area encircled by the extrusion orifices, the carrier effectively insulates the entire downstream face of the die plate from the cooling effects of the cooling liquid in the cutting chamber, reducing heat loss and increasing operating efficiency.

The solid face plate 34 may further be provided with a wear limit indicator hole (not shown) that indicates wear life remaining on the hard anti-wear element. This hole can be machined into the carrier so as to be exposed when grinding the solid die plate to its maximum.

The die insert body 30 is typically made of carbon steel while the hard anti-wear element 38 is made of a high-wear-resistant material such as tungsten carbide, titanium carbide alloys, cobalt-based hard cladding materials, nickel-based hard cladding materials, and the like. In a preferred construction, the carrier 36 is made of a nickel alloy. The hard anti-wear element 38 may be formed as a solid tungsten carbide ring or, alternatively, may be composed of a plurality of tungsten carbide tiles as is known in the art. Generally, smaller dies are made with a solid face ring while tiles are used in the construction of larger die plates.

Figure 3:
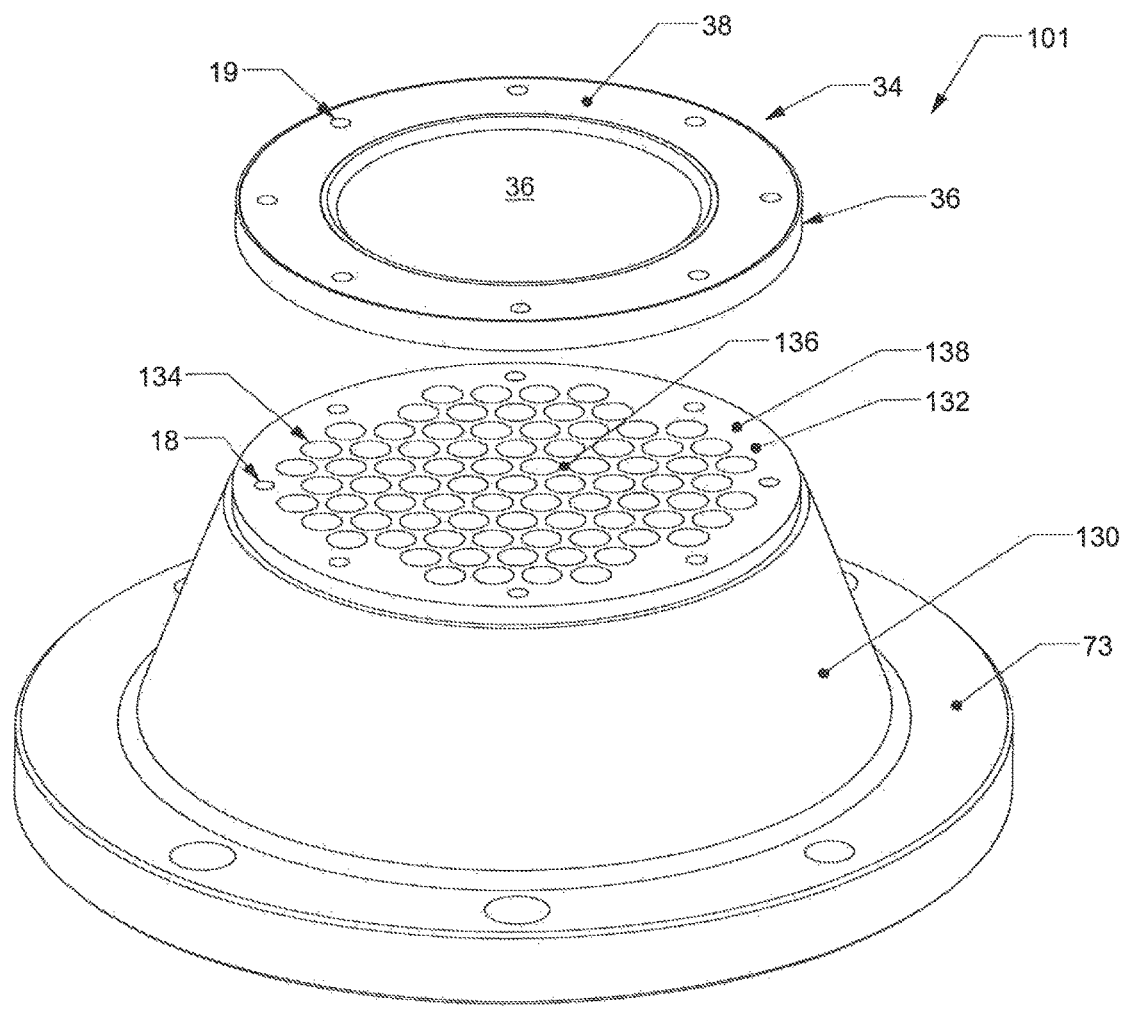
FIG. 3 is an exploded perspective view of the die insert body and face plate according to a first embodiment of the die plate of the present invention having a two-part configuration like that shown in FIG. 1, with the solid face plate spaced away from the apertured downstream face of the die insert body and insulation holes formed in its center portion.

An exploded view of a first embodiment of the die insert body and face plate in the two-part configuration of the die plate (see FIG. 1) is shown in FIG. 3. The die plate, generally designated by reference numeral 101, includes a die insert body 130 and the solid face plate 34. The downstream face 132 of the die insert body 130 is provided with a plurality of open apertures or hollow longitudinally extending insulation holes 134 formed in the center portion 136 of the face 132. The open apertures or insulation holes provide for the entrapment of a non-reactive atmosphere such as nitrogen or an inert gas within the holes when the solid face plate is adhered to the downstream face of the die insert body, effectively creating a plurality of sealed, cavities filled with a non-reactive or inert gas. Non-reactive atmospheric gases provide good insulating properties and have been found to be superior to solid insulation materials.

Alternatively, in each of the embodiments described herein, a vacuum or partial vacuum, may be formed in the insulation holes. According to one preferred embodiment, the insulation holes have a vacuum or low vacuum/partial pressure nitrogen atmosphere therein. Nitrogen atmosphere is desirable to prevent oxides from forming on the metals, as might occur in the presence of oxygen, when the metals are subjected to the temperatures needed to braze the carrier layer to the die face. In the case of an inert atmosphere. Argon or any noble gas may be used.

Figure 4:
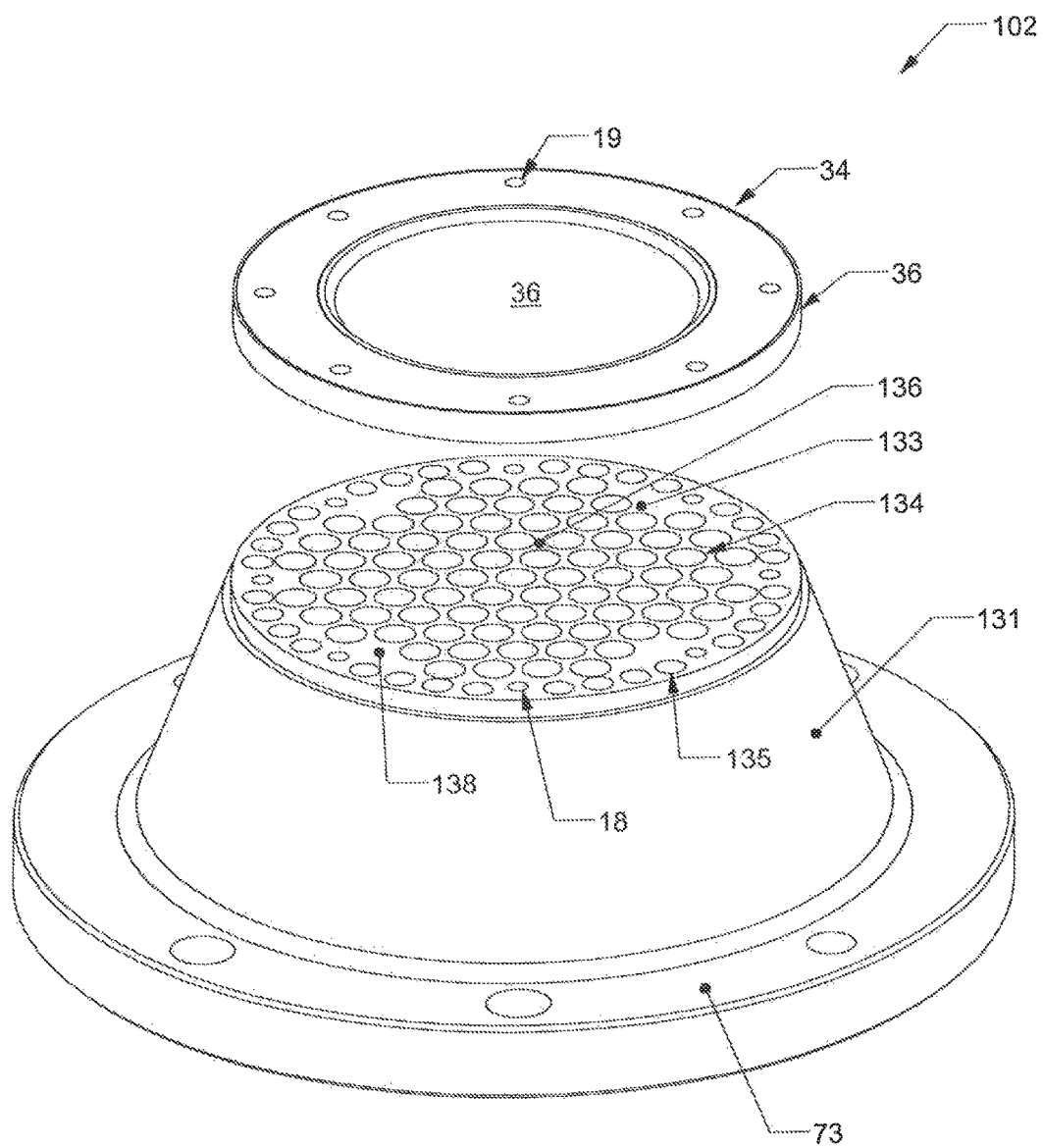
FIG. 4 is an exploded perspective view of the die insert body and face plate according to the two-part die plate of the present invention in accordance with a second embodiment, showing the solid, face plate spaced away from the apertured downstream, face of the die insert body, insulation holes being formed in an outer periphery of the downstream face as well as in the center portion.

An exploded view of a second embodiment of the two-part die plate in accordance with the present invention, and generally designated by reference numeral 102, is shown in FIG. 4. The two-part configuration of the die plate 102 includes a die insert body 131 and the solid face plate 34. The downstream face 133 of the die insert body 131 is provided with a plurality of open apertures or hollow longitudinally extending insulation holes 134 formed in the center portion 136 of the face 133. In addition to the holes formed in the center portion 136, outer insulation holes 135 are also formed in between the extrusion orifices 18 in an outer ring-shaped perimeter area 138 adjacent the outer edge of the downstream, face 133 of the die insert body 131. As in the first embodiment, the longitudinally extending insulation holes 134, 135 are open, i.e., they are not filled with a solid insulating material. Rather the holes contain a non-reactive atmospheric, gas such as nitrogen or an inert gas, forming gas-filled cavities when the downstream, face is covered by the solid face plate. Alternatively, as previously noted, the holes may contain a vacuum or partial vacuum, forming sealed cavities in the downstream face of the die insert body covered by the solid face plate.

In the first and second, embodiments as shown, the apertured face die insert body 130, 131 is configured as a two-part die plate construction but, as already noted, unitary constructions of the die plate are also possible as shown in FIG. 2. In both two-part and unitary constructions, reducing the surface area of the die insert body in contact with the solid, face plate 34 reduces heat transfer to the carrier 36.

Figure 5:
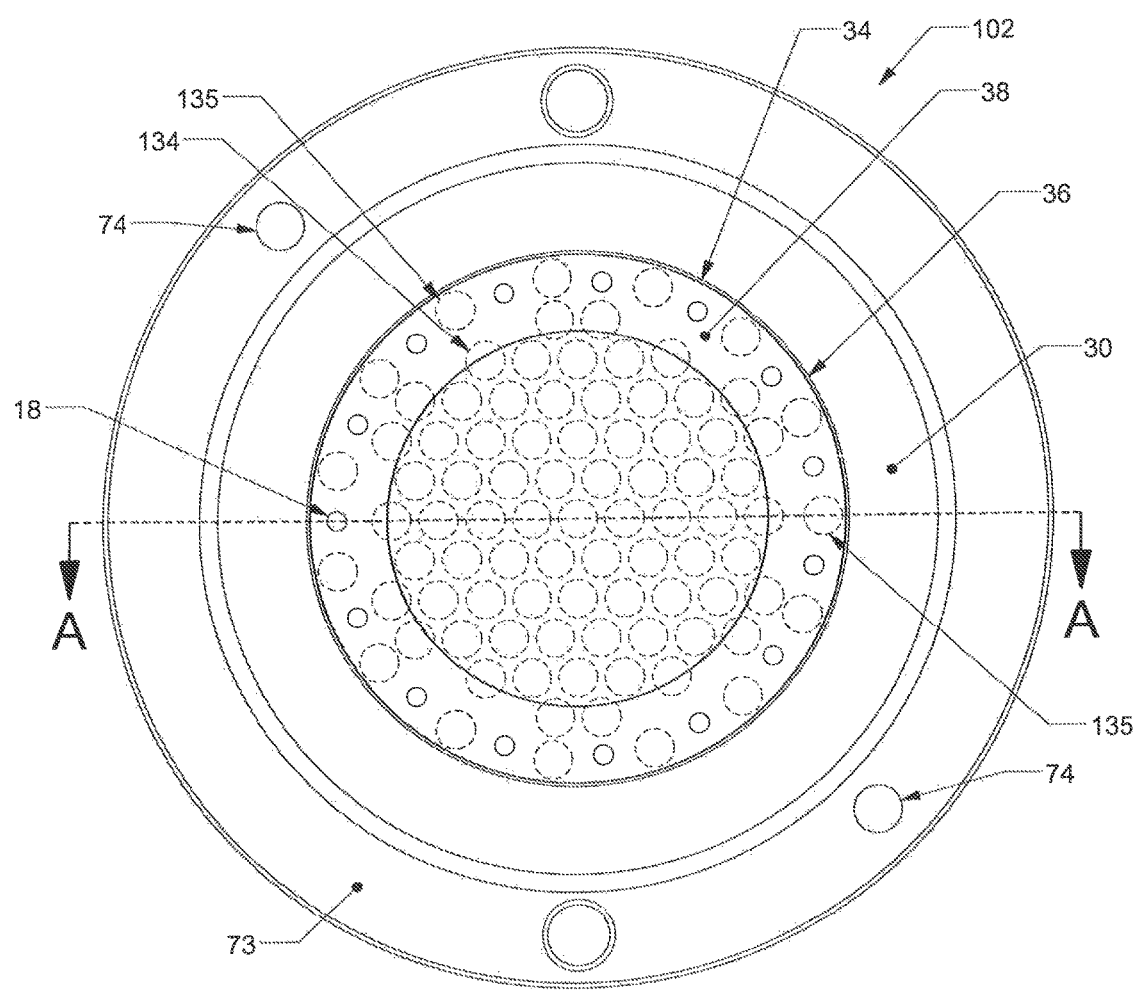
FIG. 5 is a front view of the die insert body and solid face plate shown in FIG. 4, as assembled with the insulation holes shown in dashed lines.

A front view of the solid face plate 34 as coupled to the die insert body 131 of the second, embodiment of the die plate 102, with the exit openings 19 of the plurality of extrusion orifices 18, is shown in FIG. 5. The insulation holes 135 formed in the outer perimeter area 138 and the insulation holes 134 formed in the center portion 136 of the second embodiment are covered by the solid face plate 34 and hence are shown in dashed lines.

Figure 6:
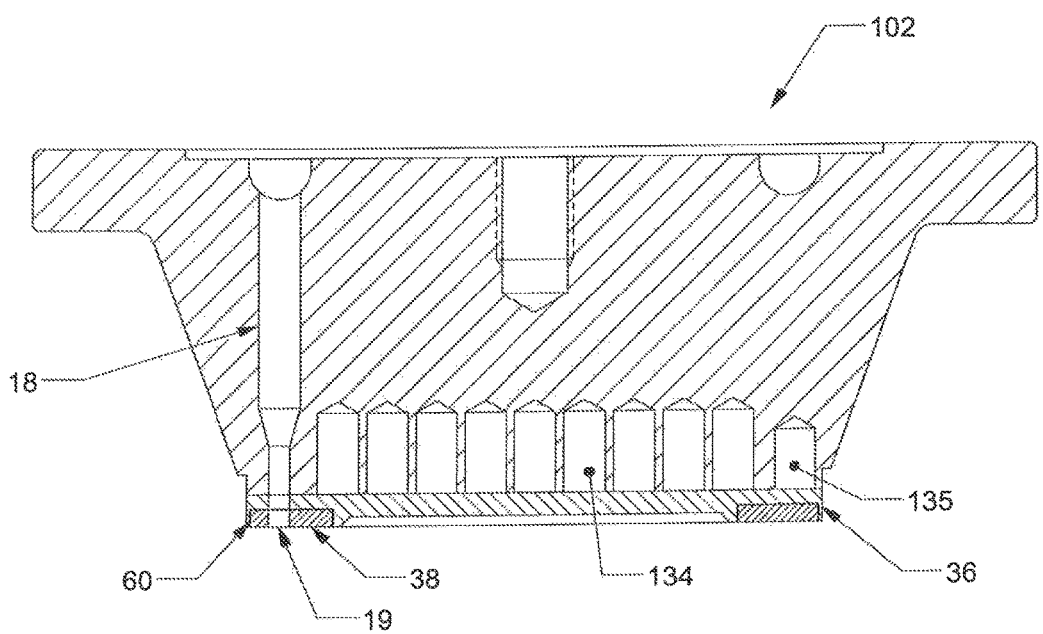
FIG. 6 is a cross-sectional view of the assembled die insert body and face plate taken along line A-A of FIG. 5.

FIG. 6 is a cross-sectional view taken along line A-A of FIG. 5, which extends through the extrusion orifices and through the outer insulation holes 135 in the perimeter area 138 of the downstream face 133.

As can be seen in FIG. 6, the insulation holes 134, 135 do not extend all the way through the die insert body 131. The holes 134, 135 are preferably between about 0.050 inches to 0.500 inches deep, and there can be multiple different hole depths in the same die insert body. Similarly, the holes may be uniform in diameter or of differing diameters, such as smaller diameter outer holes 135 in the perimeter area 138 and larger diameter holes 134 in the center portion 136 as shown in FIG. 4. While the diameter of the holes may be smaller or larger, a preferred size range is between about 0.062 inches and about 0.250 inches. The spacing between the holes generally depends on the diameter of the holes but is preferably between about 1.2 times to about 2 times the hole diameter. The distance between the holes is preferably not less than about 0.020 inches to ensure the integrity of the face 132.

The grid-like arrangement of the centrally positioned insulation holes 134 may create a 60° triangular grid pattern as shown in FIG. 3, or a square pattern, circular pattern or the like. The 60° triangular grid pattern is preferred as this hole arrangement allows for a larger number of holes 134 to fit inside the center portion of the die insert body 130 as compared with other alternative hole patterns. Also, while the insulation holes are shown as round on the downstream face, other hole shapes may be made including hexagonal, square, rectangular, triangular, polygonal and oval.

Figure 7:
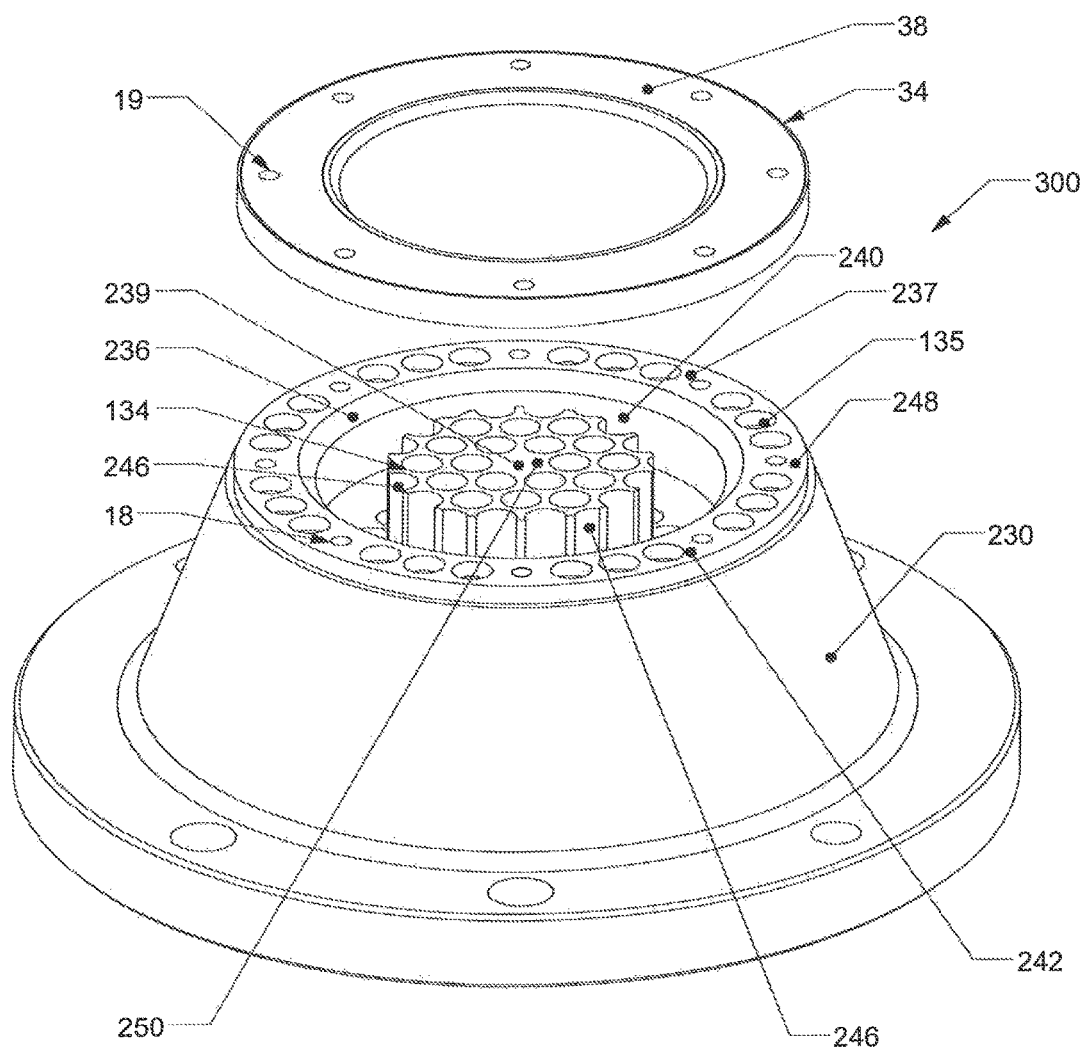
FIG. 7 is an exploded, perspective view of the die plate of the present invention in accordance with a third embodiment showing the solid face plate spaced away from the apertured downstream face of the die insert body, with a circular groove formed therein to create an outer annular ring with insulation holes between the extrusion orifices and a center boss with insulation holes.

An exploded view of a third embodiment of the die plate in accordance with the present invention, generally designated by reference numeral 300, is shown in FIG. 7.

The third embodiment of the die plate 300 has a die insert body 230 with a generally circular groove, generally designated by reference numeral 240, cut therein between the outer periphery, generally designated by reference numeral 248, of the die insert body 230, where the extrusion orifices 18 and outer insulation holes 135 are formed, and a centermost part, generally designated by reference numeral 250, of the die insert body. The groove 240 thereby divides the downstream face into an outer ring 242 with the extrusion orifices 18 and outer insulation holes 135 therein, and a center boss 244 also having insulation holes 134 formed therein and spaced from the ring 242 by the groove 240. The circular groove 240 preferably cuts into some of the centrally positioned insulation holes 134, leaving semi-circular cutouts 246 around the outer periphery of the center boss 244. The inner diameter of the ring 242 preferably has a chamfered upper edge 236 to further reduce the surface area of the downstream, face having heat contact with the solid face plate.

Figure 8:
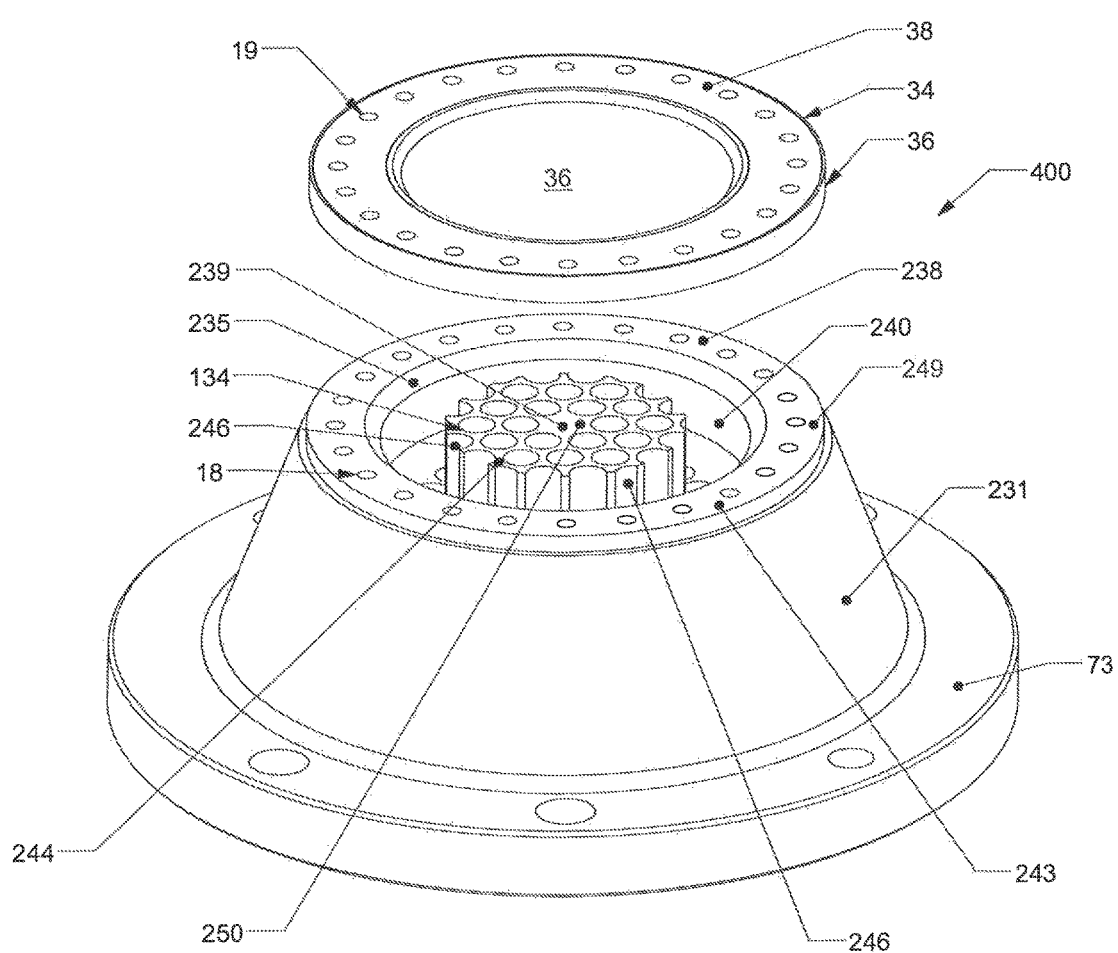
FIG. 8 is an exploded perspective view of the die plate of the present invention in accordance with a fourth embodiment showing the solid face plate spaced away from the apertured downstream face of the die insert body, with a circular groove formed therein to create an outer annular ring and a center boss, with insulation holes only being formed in the center boss and not in between the extrusion orifices in the outer ring.

A fourth embodiment of the die plate according to the present invention is shown in FIG. 8 and generally designated by reference numeral 400. Like the third embodiment, the fourth embodiment of the die plate has a die insert body 231 with a circular groove 240 cut therein between the outer periphery, generally designated by reference numeral 249, of the die insert body 231, where the extrusion orifices 18 are formed, and the centermost part 250 of the die insert body 231. The groove 240 thereby creates an outer ring 243 with the extrusion orifices 18 therein, and a center boss 244 having insulation holes 134 formed, therein and spaced from the ring 243 by the groove 240. As shown, in the fourth embodiment, formation of the insulation holes 134 is limited to the center boss 244; outer insulation holes are not formed in between, the extrusion orifices in the ring 243. As in the third embodiment, the inner diameter of the ring 243 preferably has a chamfered upper edge 235.

In both the third and fourth embodiments, the combination of the circular groove 240 and the insulation holes 134 in the boss 244 significantly reduces the surface area of the resulting "downstream face" of the die insert body 230, 231, again restricting heat transfer to the carrier. In each of the grooved embodiments, the "downstream" face is constituted by the outer surface 237, 238 of the ring 242, 243 and the outer surface 239 of the boss 244. The outer surfaces 237, 238, 239 are in abutment with the upstream side of the solid face plate 34 when the die plate is assembled. Also, as in the first and second embodiments, the open apertures or longitudinally extending insulation holes provide for the entrapment of a non-reactive atmosphere such as nitrogen or an inert gas within the holes when the solid face, plate is adhered to the downstream face of the die insert body, effectively creating a plurality of gas-filled cavities. The grooves also remain open or "unfilled" except for the gases trapped therein. Alternatively, a vacuum or partial vacuum may be formed in the groove as with the insulation holes.

Figure 9:
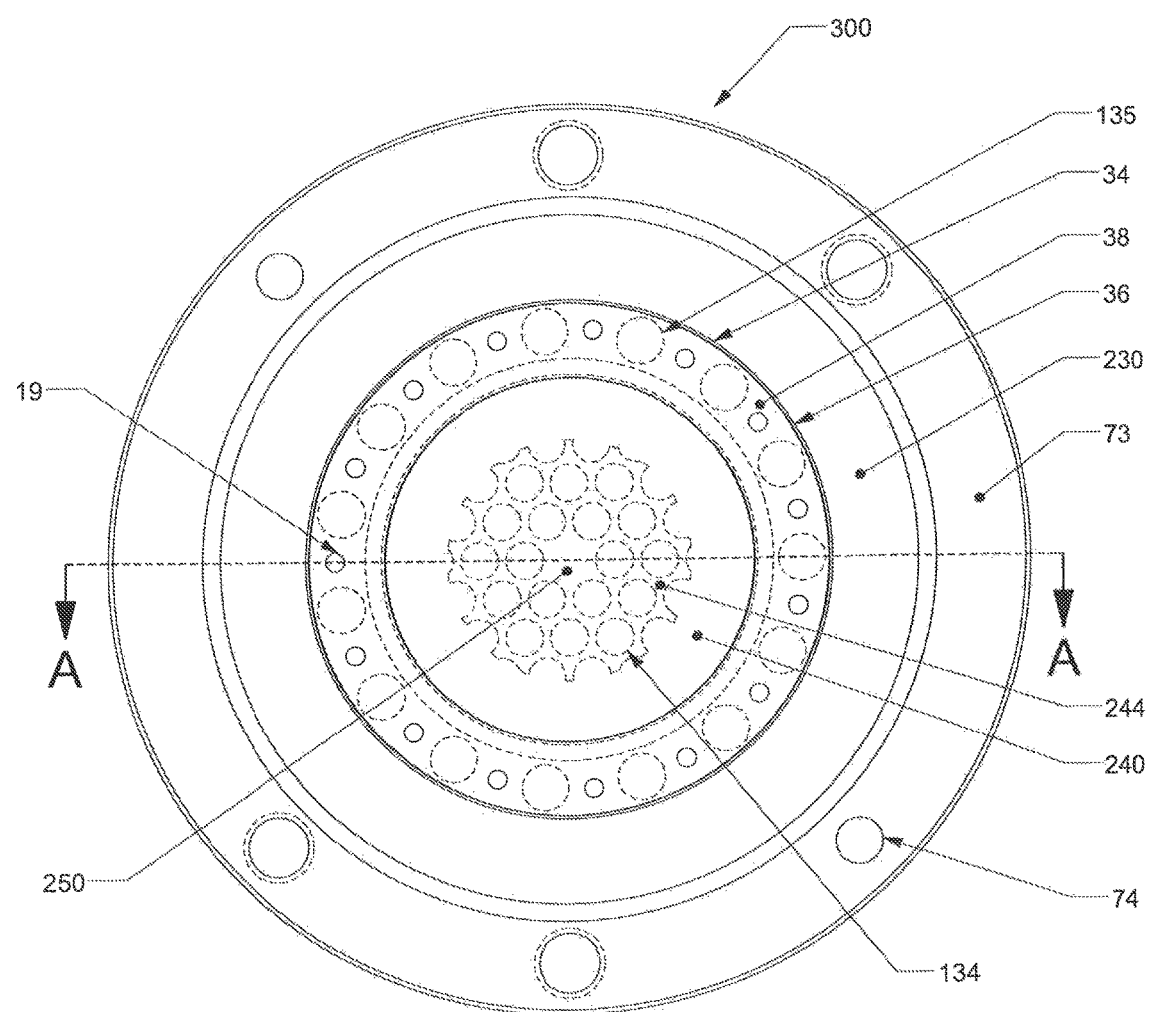
FIG. 9 is a front view of the die insert body and solid face plate shown in FIG. 7, as assembled with the center boss and insulation holes shown in dashed lines.

A front view of the solid face plate 34 as coupled to the die insert body 230 of the third embodiment of the die plate 300, with the exit openings 19 of the plurality of extrusion orifices 18, is shown in FIG. 9. The groove and the outer insulation holes 135 formed in the perimeter area 248 and the insulation holes 134 formed in the center portion 250 of the third embodiment; are covered by the solid face plate 34 and hence are shown in dashed lines.

Figure 10:
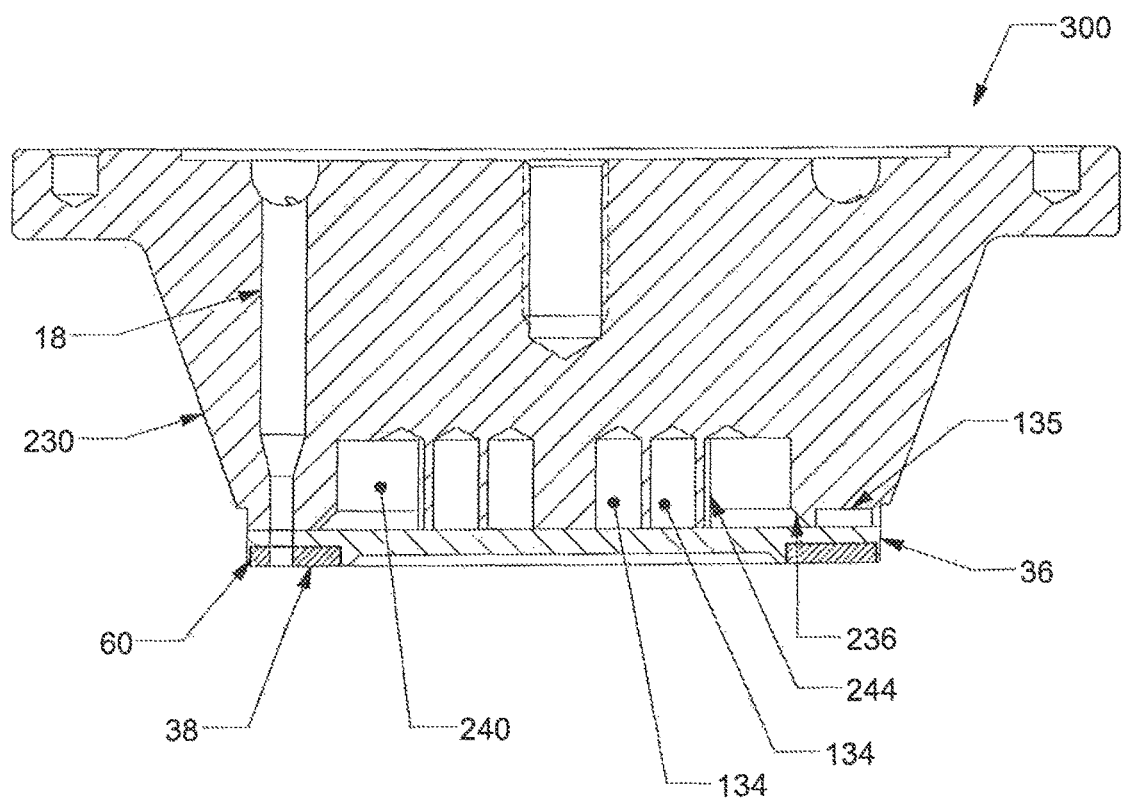
FIG. 10 is a cross-sectional, view of the assembled die insert body and face plate taken along line A-A of FIG. 9.

FIG. 10 is a cross-sectional view taken along line A-A of FIG. 9, which extends through the extrusion orifices and through the outer insulation holes 135 in the perimeter area 248 of the downstream face 237.

In all of the embodiments, the insulation holes are preferably drilled into the die insert body although other methods of manufacture could be used. The groove 240 found in the third and fourth embodiments is milled to form the center boss 244. The outer surface 239 of the center boss 244 is flush with the outer surface 237, 238 of the ring 242, 243. The center boss provides structural support for the solid face plate 34 to reduce deflections and bending of the carrier 36. By being generally circular and concentric to the carrier 36 and wear surface 38, the milled groove 240 helps to equalize the temperature of the die insert body 230, 231 and carrier 36 to promote even flow of polymer through the extrusion orifices 18.

Figure 11:
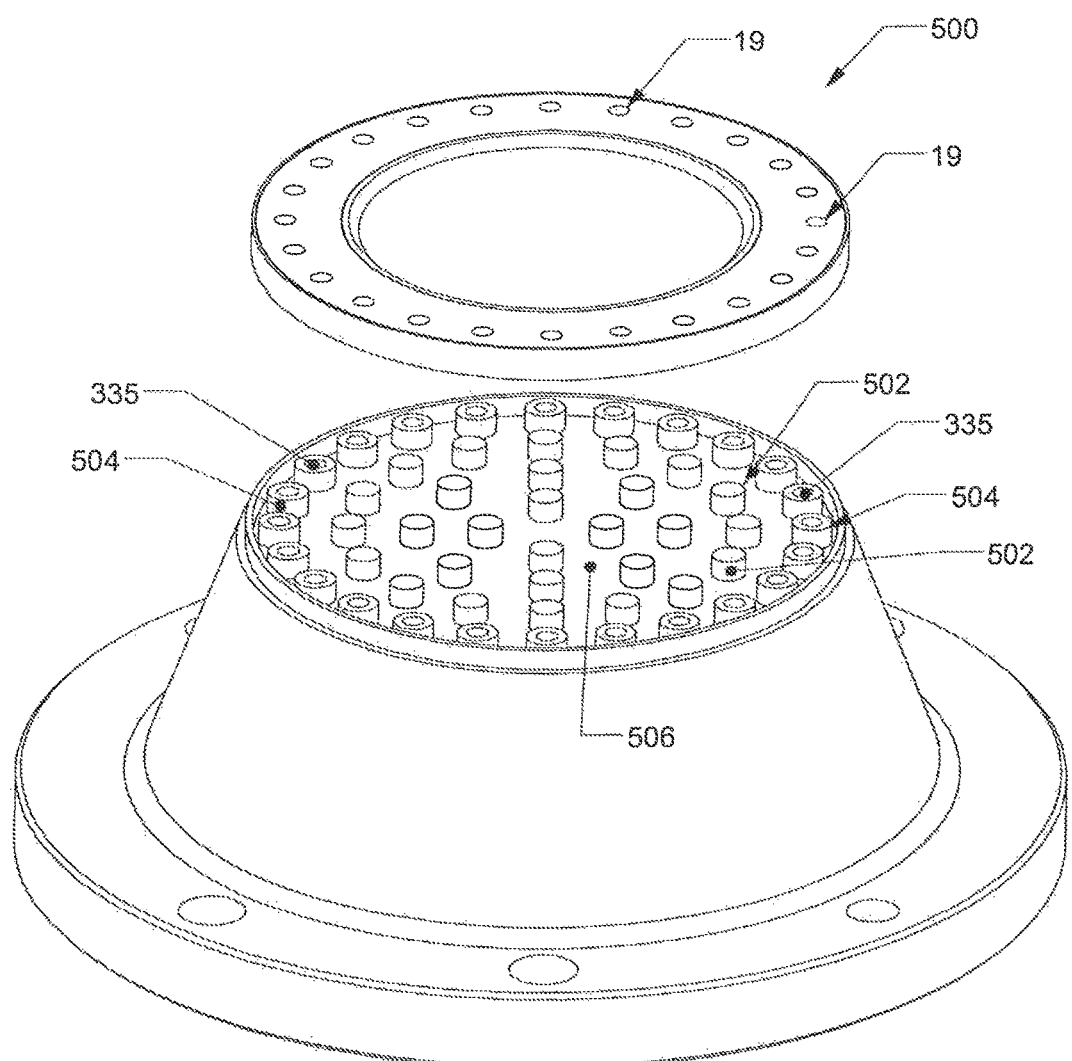
FIG. 11 is an exploded perspective view of the die plate of the present invention in accordance with a fifth embodiment showing the solid face plate spaced away from the downstream face of the die insert body, the downstream face having a support post/pillar configuration, the outer perimeter pillars having holes formed therethrough to align with the extrusion orifices in the solid face plate.

Grooves made to leave bosses of other shapes could also be formed. For example, the groove could be in the form of two intersecting lines leaving four, preferably equidistantly spaced, bosses to support the solid face plate. It is also possible to cut out larger parts of the center portion as in a fifth embodiment of the die plate, generally designated by reference numeral 500, shown in FIG. 11. In the fifth embodiment of the die plate 500, the cutout portions leave centrally positioned support posts or pillars 502 and outer support posts or pillars 504. With this construction, the centrally positioned support posts or pillars 502 do not have insulation holes formed therein. Rather, the desired insulation characteristics are provided by the open area 506 in between the posts or pillars 502. The pillars 502 can be spaced from one another at regular or irregular intervals provided their number is sufficient and the spacing between them small enough to ensure the carrier is adequately supported to prevent bending or deformation thereof. The outer posts or pillars 504 have holes 335 formed therethrough to align with the extrusion orifice exits 19 in the solid face plate through which polymer passing through the extrusion orifices 18 is extruded.

Other configurations for the apertured downstream face of the die plate body that provide reduced surface contact area between the downstream face and the solid face plate affixed thereto are also possible and are within the scope of the instant application, bearing in mind the desired balance between, reducing the surface area of the downstream face of the die plate body available for heat transfer, and retaining sufficient surface area to support a good brazed attachment of the solid face plate to the downstream face.

As described herein, the present invention provides effective insulation for the die plate body using only the formation of longitudinally extending insulation holes, with or without an annular groove, in the downstream face. No additional components or elements are required to obtain very good insulation performance. Rather, the holes alone, whether filled with a non-reactive atmosphere or inert gas, or having a vacuum formed therein, in conjunction with the solid face plate covering the entire downstream face of the die plate body have been found to significantly reduce heat loss from the die plate body and effectively prevent freeze off of the molten polymer at the cutting face.

The foregoing descriptions and drawings should be considered as illustrative only of the principles of the invention. The invention may be configured in a variety of shapes and sizes and is not limited by the dimensions of the preferred embodiment. Numerous applications of the present, invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A die plate for an underwater pelletizer comprising:
a die plate body having a plurality of extrusion orifices in a generally circular arrangement adjacent a periphery of said die plate body, and a plurality of open apertures formed in a downstream face of said die plate body; and
a solid face plate positioned to cover said downstream face of the die plate body and having extrusion orifice extensions extending through a periphery of said solid face plate and mating with said die plate body extrusion orifices, a downstream side of said solid face plate forming a pelletizer cutting surface, said plurality of open apertures forming hollow cavities when covered by the solid face plate.

2. The die plate as set forth in claim 1, wherein the hollow cavities in the downstream face of the die plate body are filled with a non-reactive atmosphere.

3. The die plate as set forth in claim 1, wherein the hollow cavities in the downstream face of the die plate body are filled with nitrogen or an inert gas.

4. The die plate as set forth in claim 1, wherein a vacuum is formed in the hollow cavities in the downstream face of the die plate body.

5. The die plate as set forth in claim 1, wherein the die plate body is unitary in construction.

6. The die plate as set forth in claim 1, wherein the die plate body has a two-part construction including a die plate base member and a removable die insert body.

7. The die plate as set forth in claim 1, wherein the solid face plate includes a disk-shaped carrier with a hard anti-wear element or elements surrounding the extrusion orifice extensions.

8. The die plate as set forth in claim 1, wherein said plurality of open apertures are longitudinally extending insulation holes formed in a center portion of the downstream face of the die plate body.

9. The die plate as set forth in claim 8, wherein said plurality of open apertures includes a generally circular groove dividing the downstream face of the die plate body into an outer ring having the extrusion orifices and a center boss containing the plurality of longitudinally extending insulation holes formed in the center portion.

10. The die plate as set forth in claim 1, wherein said plurality of open apertures include a first plurality of longitudinally extending insulation holes formed in a center portion of the downstream face of the die plate body, and a second plurality of longitudinally extending insulation holes formed adjacent a periphery and between the extrusion orifices in the downstream face of the die plate body.

11. The die plate as set forth in claim 10, wherein said plurality of open apertures further includes a generally circular groove separating the periphery of the die plate body and the center portion to form a center boss containing the first plurality of longitudinally extending insulation holes and an outer ring containing the second plurality of insulation holes.

12. An underwater pelletizer comprising:
a die plate including a die plate body having a plurality of extrusion orifices in a generally circular arrangement adjacent a periphery of said die plate body, and a plurality of open apertures formed in a downstream face of said die plate body;
a solid face plate positioned to cover said downstream face of the die plate body and having extrusion orifice extensions extending through a periphery of said solid face plate and mating with said die plate body extrusion orifices, a downstream side of said solid face plate forming a pelletizer cutting surface, said plurality of open apertures forming hollow cavities when covered by the solid face plate;

a cutter hub assembly having a plurality of cutter blades positioned adjacent the cutting surface for cutting polymer being extruded through said extrusion or into pellets; and a cutting chamber enclosing the cutter hub assembly and including a water inlet and a water and pellet slurry outlet, water circulating through the cutting chamber cooling, solidifying and entraining the pellets into a water and pellet slurry for discharge through said outlet.

13. The pelletizer as set forth in claim 12, wherein the hollow cavities in the downstream face of the die plate body are filled with a non-reactive atmosphere.

14. The pelletizer as set forth in claim 12, wherein the hollow cavities in the downstream face of the die plate body are filled with nitrogen or an inert gas.

15. The pelletizer as set forth in claim 12, wherein a vacuum is formed in the hollow cavities in the downstream face of the die plate body.

16. The pelletizer as set forth in claim 12, wherein said plurality of open apertures are longitudinally extending insulation holes formed in a center portion of the downstream face of the die plate body.

17. The pelletizer as set forth in claim 16, wherein said plurality of open apertures includes a generally circular groove dividing the downstream face of the die plate body into an outer ring having the extrusion orifices and a center boss containing the plurality of longitudinally extending insulation holes formed in the center portion of the die plate body.

18. The pelletizer as set forth in claim 12, wherein said plurality of open apertures include a first plurality of longitudinally extending insulation holes formed in a center portion of the downstream face of the die plate body, and a second plurality of longitudinally extending insulation holes formed adjacent a periphery and between the extrusion orifices in the downstream face of the die plate body.

19. The pelletizer as set forth in claim 18, wherein said plurality of open apertures further includes a generally circular groove separating the periphery of the die plate body and the center portion to form a center boss containing the first plurality of longitudinally extending insulation holes and an outer ring containing the second plurality of insulation holes.

20. The pelletizer as set forth in claim 12, wherein the die plate body is unitary in construction.

21. The pelletizer as set forth in claim 12, wherein the die plate body has a two-part construction including a die plate base member and a removable die insert body.

* * * * *